W. J. KALTZ.

METHOD OF ASSEMBLING SPOKED WHEELS.

APPLICATION FILED DEC. 2, 1916.

Reissued Feb. 10, 1920.

14,803.

Inventor

William J. Kaltz

By Whittemore Hulbert & Whittemore

Attorneys

UNITED STATES PATENT OFFICE.

WILLIAM J. KALTZ, OF WINDSOR, ONTARIO, CANADA, ASSIGNOR TO KELSEY WHEEL COMPANY, OF DETROIT, MICHIGAN, A CORPORATION OF MICHIGAN.

METHOD OF ASSEMBLING SPOKED WHEELS.

14,803. Specification of Reissued Letters Patent. Reissued Feb. 10, 1920.

Original No. 1,189,827, dated July 4, 1916, Serial No. 868,685, filed October 26, 1914. Application for reissue filed December 2, 1916. Serial No. 134,754.

*To all whom it may concern:*

Be it known that I, WILLIAM J. KALTZ, a citizen of the United States of America, and a resident of Windsor, in the Province of Ontario and Dominion of Canada, have invented certain new and useful Improvements in Methods of Assembling Spoked Wheels, of which the following is a specification.

The invention relates to the manufacture of spoked wheels and more particularly wheels designed for use upon motor vehicles. It is the object of the invention to simplify the assembly of such wheels, dispensing with a number of operations heretofore deemed necessary.

The apparatus herein described and illustrated for carrying out my novel process is made the subject-matter of my co-pending application, Serial No. 868,686, filed October 26, 1914.

In the present state of the art, wheels for motor vehicles are usually formed of a pair of wooden semi-circular felly sections having spokes engaged therewith, said sections being held together by a continuous metallic rim into which they are pressed. The usual method of assembling is, first, to place the two sections in a clamping machine, where radial pressure is applied to the felly opposite each of the spokes, forcing the inner ends of said spokes in close proximity. A false hub is then bolted to the inner ends of the spokes, after which the sections are removed from the press and are placed in a lathe for trimming the periphery of the felly to a true circle. The next operation is the compressing of the clamped sections into the metallic rim, after which the false hub is removed.

Where the above-described method is employed it is necessary to provide sufficient surplus stock in the felly sections for the trimming operation. Furthermore when the radial pressure is relieved from the felly there is a tendency for the latter to spring away from the spokes, so that when mounted in the rim all of the spokes are not under equal compression. A further disadvantage of the method is that it requires a number of distinct operations in separate machines for the assembly of each wheel. With my improved method I overcome these objections by pressing the felly sections with the spokes in engagement therewith directly into the metallic rim, thereby avoiding the necessity for the surplus stock in the felly, as well as cutting out several operations.

Figure 1:
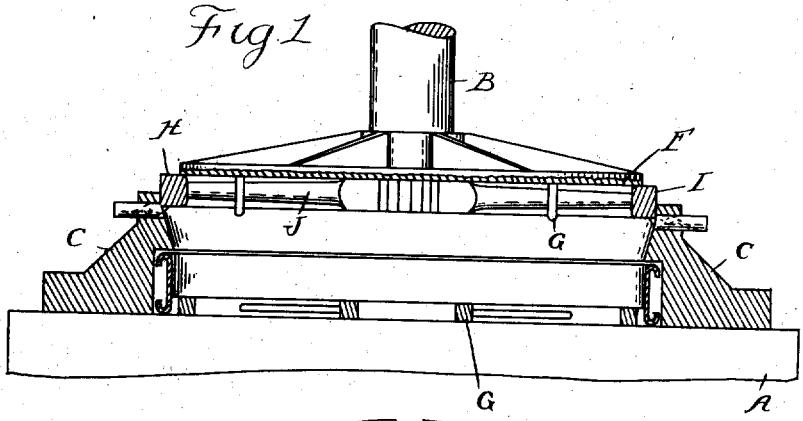
Figure 1 is a vertical central section through said apparatus.
Figure 2:
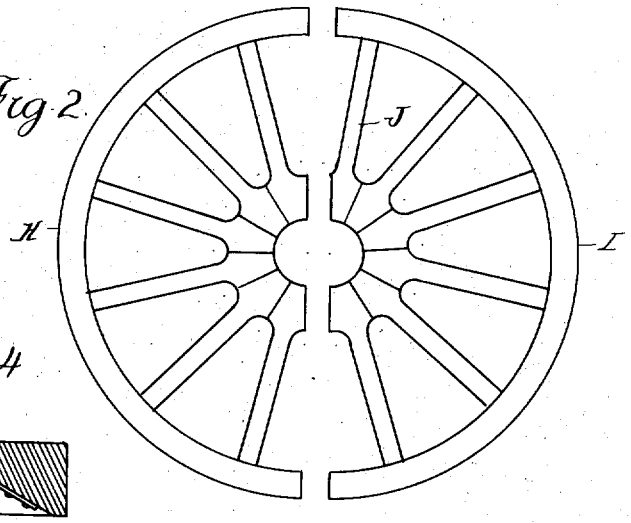
Fig. 2 is a plan view of the felly sections with the spokes in engagement therewith before assembly with the rim.

As shown, A represents the bed of a press and B the reciprocatory plunger. C is an annular member mounted upon the bed and having a tapering or conical cross section, the upper end of which is of sufficient size to receive the felly blanks, while the lower end is of a diameter substantially corresponding with that of the metallic wheel rim. The member C is cut away below its tapered portion so as to permit of the lateral insertion of the wheel rim D, as shown in Fig. 1, and suitable means, such as the stop E, is provided for properly centering this rim with the member C. F is a follower plate of a diameter sufficient to bear against the felly sections but slightly less than the minimum diameter of the member C. G are pins or other guide devices depending from the follower F and adapted to engage one spoke of each felly section to properly guide the same. G′ is a stop upon the bed A serving to limit downward motion of the felly sections.

To assemble a wheel, the operator first places a pair of complementary felly sections H I having the spokes J in engagement therewith into the upper end of the member C beneath the follower F, and one of the spokes J is engaged with the depending guide pins G on the follower. A rim D is also inserted in the recess beneath the tapered portion of the member C and centered by the guide E. The plunger B is then depressed, causing the plate F to bear equally upon all portions of the felly sections H I, forcing them down in the tapering or conical portion of the member C. This will place a radial pressure upon each of the spokes and will also bend the felly into a true circular form and reduce it to a diameter exactly corresponding to the rim. The rim D before being placed in the machine is preferably heated to a suitable temperature for properly expanding it so that after the felly sections are pressed into engagement therewith the contraction of the metal will cause a firm clamping engagement. Furthermore, the heated metal is more pliable and consequently if there is any irregularity or departure from the true circle the felly, which has been contracted to a true circular form, on being forced into the rim will cause the latter to assume a corresponding form.

Figure 4:
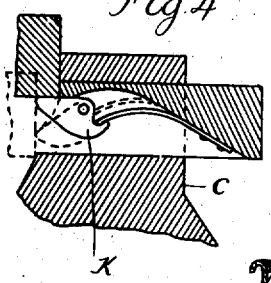
Fig. 4 is a cross-section showing the manner of initially supporting the felly sections.
Figure 5:
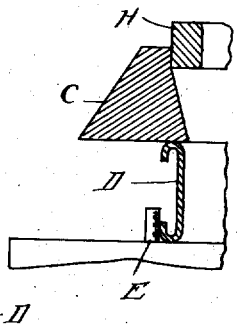
Fig. 5 is a cross-section showing the stop for centering the rim with the felly.
Figure 3:
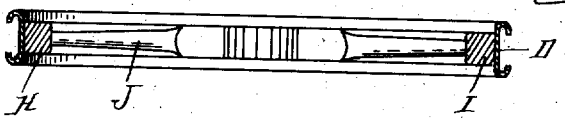
Fig. 3 is a section through the wheel after engagement with the rim.

For initially supporting the felly sections yieldable dogs K are arranged in recesses in the ring C, as shown in Fig. 4.

What I claim as my invention is:

1. The method of assembling spoked wheels, comprising the placing together of complementary spoked felly sections, and forcing said sections through a tapering guide into the wheel rim.

2. The method of assembling spoked wheels, comprising the placing together of complementary spoked felly sections, forcing said sections laterally through a tapering annulus into engagement with the wheel rim.

3. The method of assembling spoked wheels, comprising the placing together of complementary spoked felly sections, forcing said sections laterally through a tapering annulus into engagement with the wheel rim, and guiding one of the spokes during said movement to hold the same in exact radial relation.

4. The method of assembling spoked wheels, comprising the engagement of the spokes with felly sections, placing complementary felly sections together, circumferentially contracting said felly sections, and while contracted pressing the same laterally out of engagement with the contracting means and into the metallic rim.

5. The method of forming and assembling spoked wheels, comprising the placing together of complementary felly sections of finished size and having the spokes in engagement therewith, circumferentially contracting said felly sections to a predetermined diameter, and pressing the same out of engagement with the contracting means and into a rim of corresponding diameter.

In testimony whereof I have hereunto affixed my signature.

WM. J. KALTZ.